United States Patent [19]
Kubota et al.

[11] Patent Number: 5,474,267
[45] Date of Patent: Dec. 12, 1995

[54] METHOD AND DEVICE FOR A SMOOTH AND TIMELY DECELERATION OR STOP IN AUTOMATIC TRAIN CONTROL

[75] Inventors: Kiyoto Kubota, Mishima; Hiroto Takeuchi, Tokyo; Shinichiro Kato, Shizuoka, all of Japan

[73] Assignee: Central Japan Railway Company, Japan

[21] Appl. No.: 192,679

[22] Filed: Feb. 7, 1994

[30] Foreign Application Priority Data

Mar. 26, 1993 [JP] Japan ................................... 5-068119

[51] Int. Cl.⁶ .................................................. B61L 1/00
[52] U.S. Cl. ........................ 246/182 B; 246/62; 246/72; 246/81; 246/87; 246/182 A; 246/182 R; 104/292; 104/300
[58] Field of Search .................... 246/28 R, 31, 246/72, 64, 182 R, 182 B, 182 C, 182 A, 187 R, 167 R, 62, 81, 87; 104/290, 292, 300

[56] References Cited

U.S. PATENT DOCUMENTS

| | | |
|---|---|---|
| 4,459,668 | 7/1984 | Inoue et al. .......................... 246/182 B |
| 4,495,578 | 1/1985 | Sibley et al. ......................... 246/182 R |
| 4,556,941 | 12/1985 | Zuber ................................... 246/182 R |
| 4,562,543 | 12/1985 | Zuber et al. .......................... 346/182 R |
| 4,578,754 | 3/1986 | Sahasrabudhe et al. ............. 246/182 B |
| 5,239,472 | 8/1993 | Long et al. ........................... 246/182 R |

*Primary Examiner*—Mark T. Le
*Attorney, Agent, or Firm*—Davis, Bujold & Streck

[57] ABSTRACT

A method and device for effecting a fast but smooth deceleration or stopping of trains controlled under the automatic train control (ATC) system. Under ATC, a permitted maximum velocity is provided as an "ATC condition" to activate the brake system of the train if that velocity is exceeded. When it is necessary to alter the velocity of a train, a control center specifies a feeder section to have the ATC condition to be altered. Next, a substation corresponding to the specified feeder section is provided with notice about the alteration of the ATC condition. The notice includes the impending reduction of velocity. In response, the substation decelerates the train without using the ATC brake system provided on the train. When the train has been sufficiently slowed down such that the alteration of the ATC condition will not result in activation of the ATC brake system, the alteration of the ATC condition is then effected.

16 Claims, 12 Drawing Sheets

METHOD AND DEVICE FOR A SMOOTH AND TIMELY DECELERATION OR STOP IN AUTOMATIC TRAIN CONTROL

BACKGROUND OF THE INVENTION

This invention relates to a method and device for attaining a smooth and timely deceleration or stopping of trains which are operated under automatic train control (ATC) systems.

Automatic train control, or ATC, is a known method to control trains in railway systems. Under ATC, a permitted maximum velocity of a train is determined according to the distance to the next train ahead and various condition of each railway section. When the velocity of the train exceeds the specified permitted maximum velocity over a particular section, the ATC brake system is activated and the train is decelerated.

The permitted maximum velocity is occasionally altered according to weather, repair work on the railroads, and other conditions. For instance, the velocity of Tokaido Shinkansens running in the central part of Japan is regulated according to a stepwise reduction of predetermined maximum velocities, i.e. 270 km/h, 255 km/h, 230 km/h, 170 km/h, 120 km/h, and 70 km/h. If the train is required to run at a given limited velocity over a certain section, the permitted maximum velocity is gradually reduced in steps approaching the target limited velocity of the section. If the train has already entered the section where the velocity should have been reduced, it may occur that the velocity is required to be reduced by more than one step. Because of the rather wide range between the steps of velocity, however, an alteration of the train velocity, for example by two steps down from 230 km/h to 120 km/h may result in a sudden braking, making the passengers on board feel a sudden stopping force. The brake system may be deteriorated or have its life shortened as a result of the abrasion or other loads inflicted upon the brake systems.

Therefore, in order to alter the velocity without causing a sudden braking, a person who controls alteration of the maximum permissible velocity must consider the location of the train and reduce the velocity at an appropriate time.

However, it is quite difficult to choose an appropriate time when the railway line is congested, such as during the rush hour. On such an occasion where trains enter, one after another, into a section where alteration of the velocity must be made, the alteration has to be delayed until the line is no longer congested.

SUMMARY OF THE INVENTION

Wherefore, an object of the present invention is to provide a method and device for smoothly effecting a deceleration or stopping of trains, even on congested lines, without causing a sudden braking.

In order to achieve the stated object, a method from a first aspect of the invention is used for controlling the velocity of a train including a brake system which is automatically activated when the velocity of the train exceeds a maximum permissible velocity predetermined over a section of track, and includes the steps of: providing notice about an impending alteration of the maximum permissible velocity over the section to the train or to a facility controlling the velocity of the train; and thereafter effecting alteration of the maximum permissible velocity from the previous maximum permissible velocity to a new maximum permissible velocity.

According to the method, the predetermined condition i.e. maximum permissible velocity, for triggering activation of the brake system is not abruptly altered. The alteration of the condition is timely communicated beforehand to the train itself if the train is a common railway train. The motorman of the train, knowing that the condition will be altered, can prepare for an alteration in velocity by manually decelerating the train such that the train will be sufficiently slowed down when the condition is altered. If the train is a linear motor car, the alteration is communicated to the traction substation or any other facility where the velocity of the train is controlled in accordance with a predetermined run curve which is derived by plotting the train's velocity against its position. The run curve is offset below the ATC curve representative of the permitted maximum velocity, such that the train runs below the ATC curve and yet runs efficiently. Upon receipt of notice of alteration in velocity, the facility changes the run curve RC, without changing the ATC curve, to one that allows for the alteration in order that the train has been sufficiently slowed down once a change in a maximum permissible velocity occurs.

In a second aspect of the present invention, notice of the alteration of the condition for triggering activation of the brake systems is provided, in advance to actual alteration, to the train or any other facilities controlling the velocity of the train. Moreover, the reduction of the maximum permissible velocity in the ATC is effected after a time period sufficient to slow down the train such that the train's velocity is more easily adapted to the altered condition. Accordingly, the motorman of the train or the facility having the run curve generation apparatus can take time to perform preparatory deceleration before a reduction of the velocity actually takes place. Therefore, even on the congested lines, the alteration of the brake activation condition can be effected without difficulties.

In a third aspect of the present invention, the alteration of the condition is effected when it is confirmed that the train is in a state ready to be smoothly adapted to the reduced maximum permissible velocity. The prevention of a sudden braking is thus ensured.

In a fourth aspect of the invention, the alteration of the maximum permissible velocity is mandatorily effected after a predetermined time period even if the train is not yet in the state ready to be smoothly adapted to the reduced maximum permissible velocity. Therefore, reduction of speed is not permanently prohibited, and abrupt braking can be effected if necessary. For instance, since the security of the passengers take priority over the smoothness in deceleration or stopping, even when the train is not sufficiently slowed down within a predetermined time period, the brake activation can mandatorily be effected to attain an emergency deceleration or stop.

In a fifth aspect of the present invention, a device is provided for controlling velocity of a train comprising a brake system which is automatically activated when the velocity of the train exceeds a maximum permissible velocity predetermined over a section of track. The device comprises:

condition transmitting means for transmitting the predetermined condition;

condition alteration means for altering the condition; and notice means for providing notice about the impending alteration of the condition to the train or to a facility controlling the velocity of the train in advance to actual alteration effected by the condition alteration means.

By utilizing this device, the motorman of the train or the facility that controls the velocity of the train can be informed about the impending alteration of the brake activation condition by the notice means, and can prepare for the alteration.

In a sixth aspect of the present invention, the device is further provided with a holding means for delaying the reduction of the maximum permissible velocity for a predetermined time period. The predetermined time period may be constant or alternatively varied according to the necessary degree of alteration of the current velocity of the train.

In a seventh aspect of the present invention, the device from the fifth aspect is further provided with a state receiving means and a confirmation means. The state receiving means is for receiving the current state of the velocity of the train. The confirmation means is included in the condition alteration means in order to effect the alteration of the predetermined condition only when it is confirmed that the alteration of the predetermined condition will bring about activation of the brake system. The confirmation is made according to the current state of the train's velocity received by the state receiving means. In this way, the condition alteration is not effected until the confirmation means confirms, according to the current state of the train's velocity received by the state receiving means, that the condition alteration will not cause a sudden braking. Therefore, a sudden braking can better be prevented, which otherwise causes deterioration of the brake system and other problems.

In an eighth aspect of the present invention, the device from the seventh aspect of the invention is further provided with a mandatory alteration means. Even after a predetermined time period since notice about alteration in the maximum permissible velocity is provided, the velocity of the train may still be in the state where a sudden braking results from the a severe reduction of the maximum permissible velocity. In this case, the mandatory alteration means mandatorily performs the alteration of the maximum permissible velocity after the predetermined time period even if the speed of the train received by the state receiving means is not yet in the state that the activation of the emergency brake system is not caused. Therefore, similar to the device from the fourth aspect, the device created from the eighth aspect will operate to stop or slow the train despite possible damages to the brake system.

BRIEF DESCRIPTION OF THE DRAWINGS

The embodiments of the present invention are explained hereunder by way of examples, referring to the drawings, although it is understood that other embodiments are within the scope of the present invention, in which.

DETAILED DESCRIPTION OF THE PREFERRED EMBODIMENTS

Figure 1:
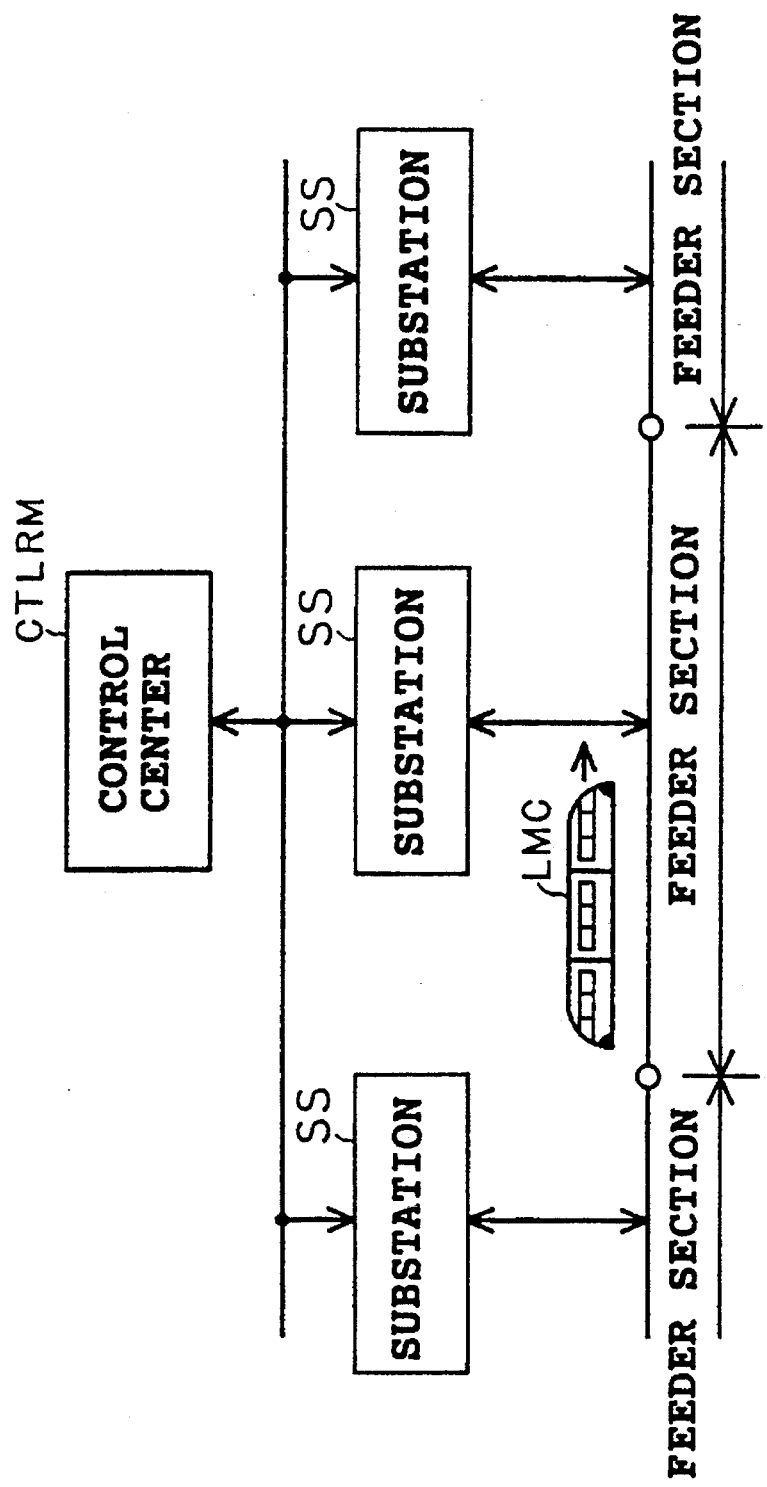
FIG. 1 is a block diagram illustrating the structure of the system of a first embodiment according to the present invention.

Three embodiments of the present invention are described hereunder referring to the drawings although it is understood that other embodiments are within the scope of the present invention.

The first embodiment is of a velocity control system according to the present invention applied to a linear motor car.

The velocity control system of the first embodiment is for the magnetic levitation railways of the on-ground primary propulsive type. As shown in FIG. 1, the velocity control system includes substations SS provided at each feeder section, and a control center CTLRM which has a large computer system and provides the substations SS with a signal to control the velocity of the train.

Figure 2:
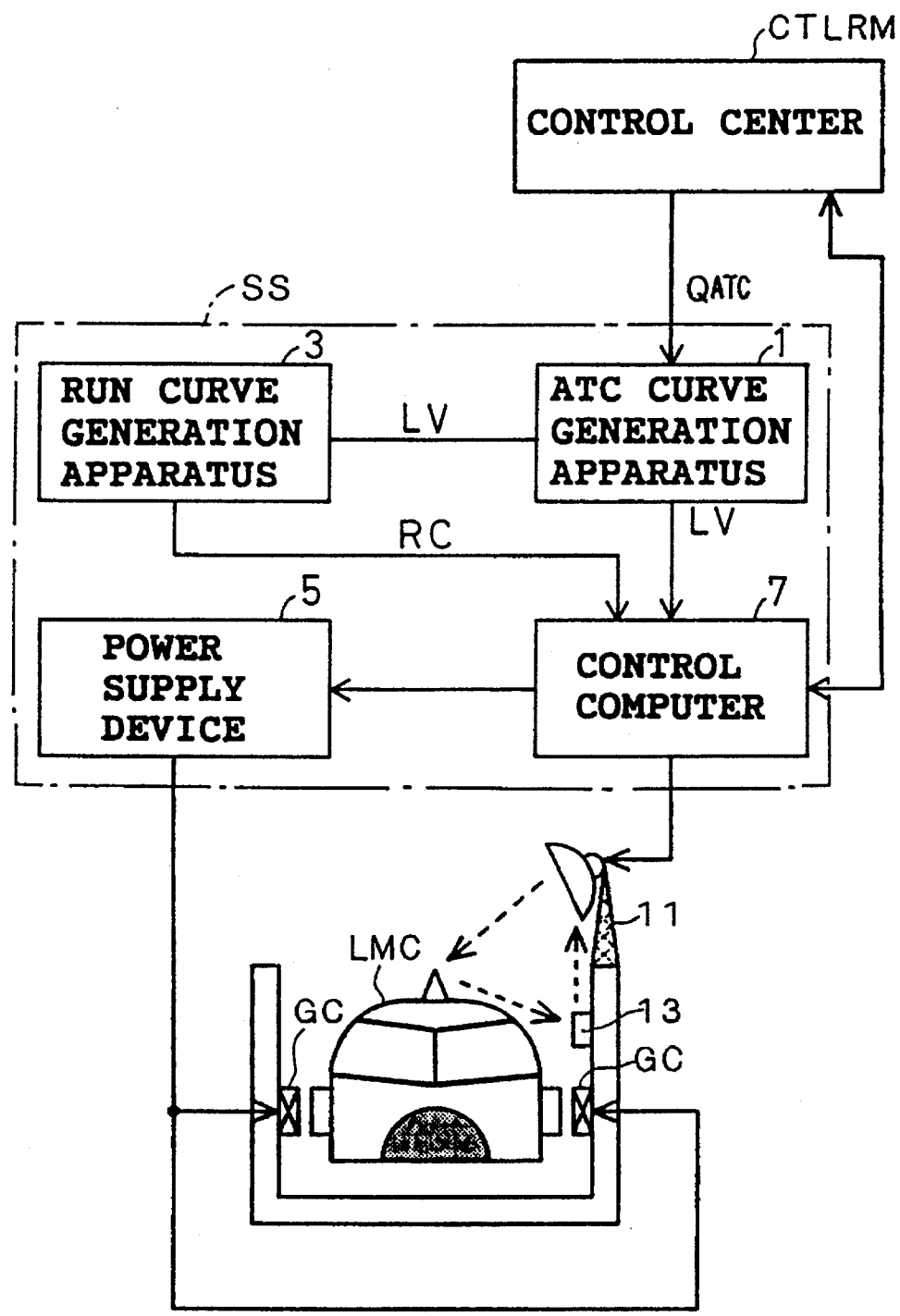
FIG. 2 is a block diagram illustrating the relevant portion of the system of the first embodiment.
Figure 3:
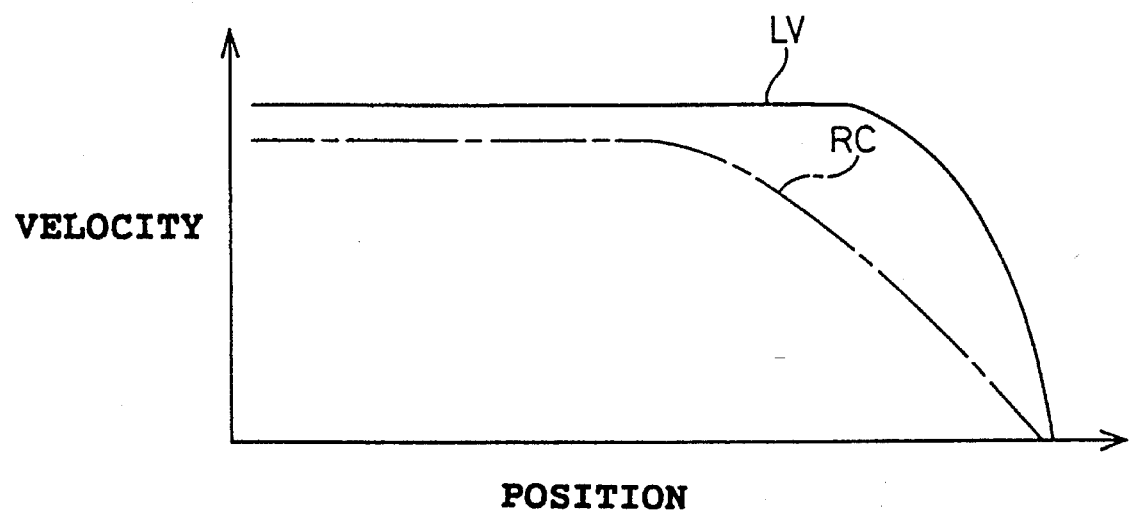
FIG. 3 is a graph showing the relationship between the ATC curve and the run curve generated in the first embodiment.

Common electric power is adapted for use in driving trains at the substations SS where the power is converted and supplied to feeders or ground coils GC via breakers. Each substation SS, as shown in FIG. 2, is provided with an ATC curve generating apparatus 1, a run curve generating apparatus 3, a power supply device 5, and a control computer 7. The ATC curve generating apparatus 1 generates an ATC curve LV according to the ATC condition QATC, namely the permitted maximum velocity, sent from the control center CTLRM. The run curve generating apparatus 3 generates a run curve RC offset from the ATC curve LV generated by the ATC curve generating apparatus 1. A feedback control is performed according to the run curve RC thus obtained, thereby controlling the velocity of a linear motor car LMC within the range of the ATC curve LV. The power supply device 5 supplies power to the ground coils GC which drive the train. The control computer 7 controls the power supply device 5 according to the run curve RC. When a specific ATC condition QATC is not designated from the control center CTLRM, a predetermined maximum velocity allowed for each feeder section is adopted. As shown in FIG. 3, the ATC curve LV and the run curve RC are graphs of the relation between position and the velocity.

Each substation SS is connected to a corresponding repeater station 11 that is also provided for each feeder section along the railway line. The repeater station 11 relays the control signals of the train, e.g. instruction to activate an emergency brake system mounted on a linear motor car LMC, that is transmitted from the control computer 7 at the substation SS. The repeater station 11 is connected to a detector 13. When a linear motor car LMC enters the territory of the detector 13, the corresponding detector 13 continually detects the velocity V and the position P of a linear motor car LMC every a few milliseconds. The signals received by the detector 13 are sent from the repeater station 11 to the control computer 7 at the substation SS.

Figure 4:
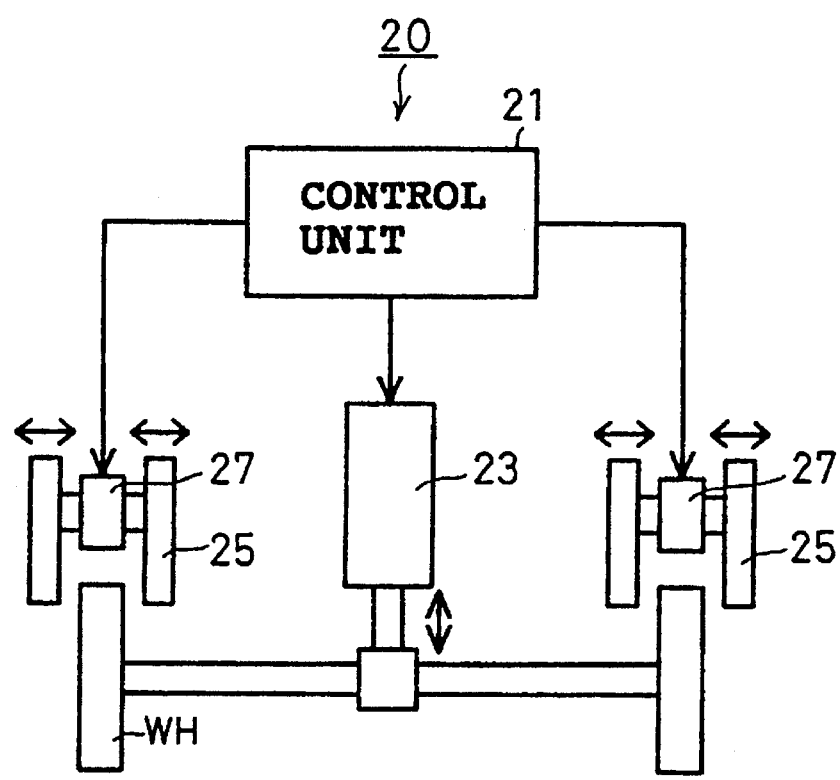
FIG. 4 is a diagram showing the structure of an emergency brake system of the first embodiment.

Deceleration of the linear motor car LMC is generally made by controlling the power supplied to the ground coils CG. In an emergency, in contrast, an emergency brake system 20 equipped on the train is also activated in addition to cutting off the power to the ground coils CG. As shown in FIG. 4, the emergency brake system 20 includes a control unit 21, a wheel elevator 23, and a brake actuator 27. The wheel elevator 23, controlled by the control unit 21, elevates and lowers the wheels WH. The brake actuator 27, also controlled by the control unit 21, actuates disk brakes 25 provided on the wheels WH.

When an emergency stop is instructed, the brake system 20 first actuates the wheel elevator 23, thereby lowering the wheels WH until the train is supported by the wheels WH on the rails. The brake actuator 27 is then actuated to apply the disk brakes 25, and the mechanical emergency stop is performed. Once actuated, the emergency brake system 20 of a linear motor car LMC that is designed to run at a maximum of 500 km/h must be replaced since its wheels WH, the disk brakes 25 and other parts are severely damaged.

A process of controlling the velocity of a train using ATC is explained hereunder.

Figure 5:
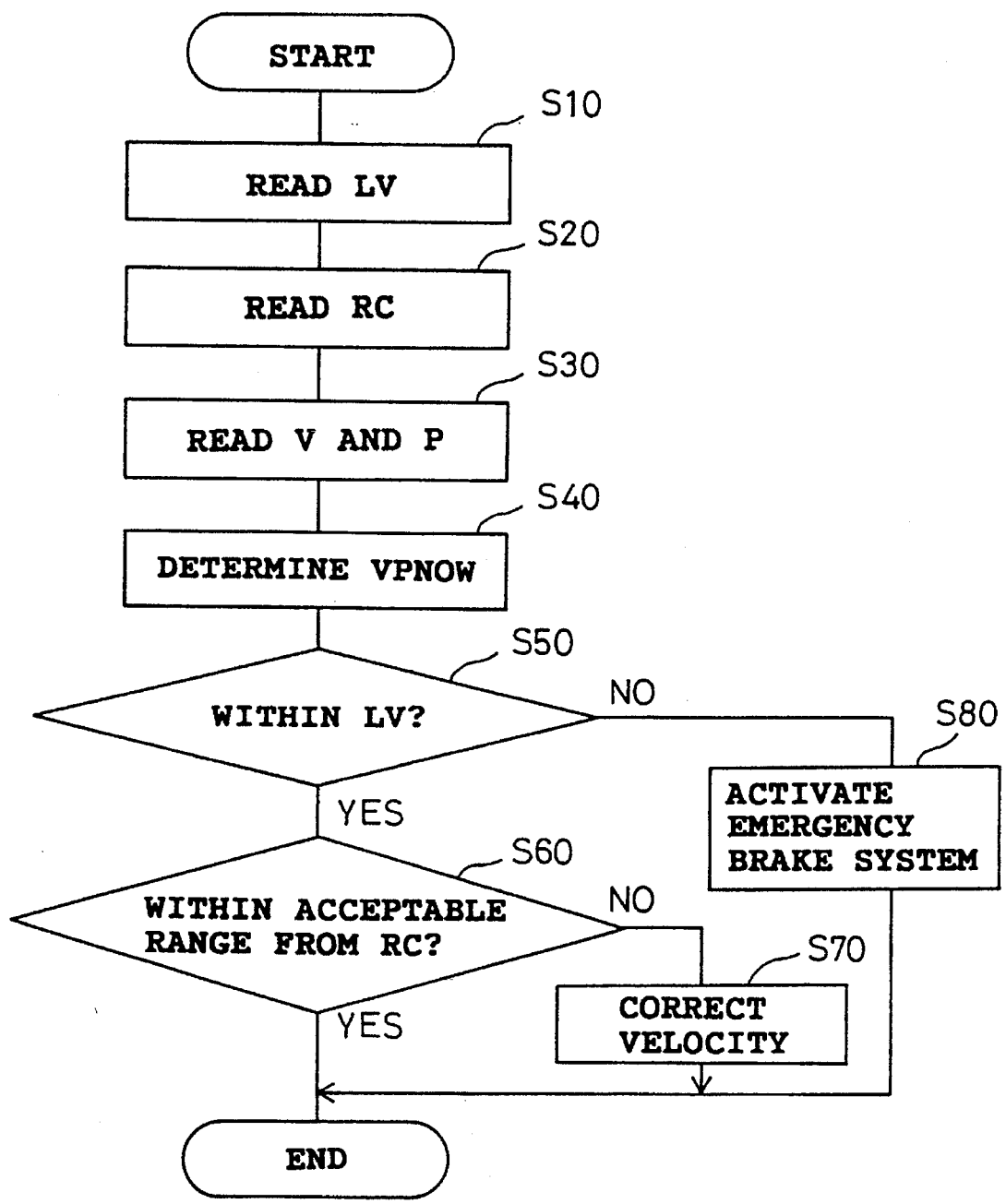
FIG. 5 is a flowchart of the automatic velocity control process effected in the first embodiment.

As shown in the flowchart of FIG. 5, in step S10, the control computer 7 first reads the ATC curve LV that the ATC curve generating apparatus 1 has generated according to the ATC condition QATC sent from the control center CTLRM. A run curve RC that the run curve generating apparatus 3 has generated is also read, in step S20. Further, the information concerning the actual velocity V and the position P of the linear motor car LMC is read, in step S30. According to the velocity V and the position P of the train, the current velocity versus position relation VPNOW of the linear motor car LMC is obtained, in step S40.

Subsequently, it is determined whether the current velocity versus position relation VPNOW is within the range of the ATC curve LV, step S50. If "YES" is determined at the step S50, it is next determined whether the current velocity versus position relation VPNOW is within the permissible range from the run curve RC, step S60. If "YES" is determined at the step S60, the present process ends. When "NO" is determined at the step S60, the velocity of the train is changed by a feedback control so as to come within the permissible range of the run curve RC, in step S70.

On the other hand, when the velocity of the train exceeds the permitted maximum velocity, it is determined at step S50 that the current velocity versus position relation VPNOW is not within the ATC curve LV, the power supply to the corresponding feeder section is cut off and the control computer 7 at the substation SS instructs actuation of the emergency brake system 20, in step S80. In response, the emergency brake system 20 provided on the linear motor car LMC acts, thereby performing mechanical braking in the above described manner.

As aforementioned, the velocity of the linear motor car LMC is automatically regulated within the ATC curve LV based on the ATC condition QATC designated by the control center CTLRM. The ATC condition QATC of maximum velocity is altered according to stormy weather, repair work required on the railway, and other cases where allowable conditions for the train's velocity is more restricted than usual.

The alteration of the ATC condition QATC is effected as a result of the following process performed by the control center CTLRM.

Figure 6:
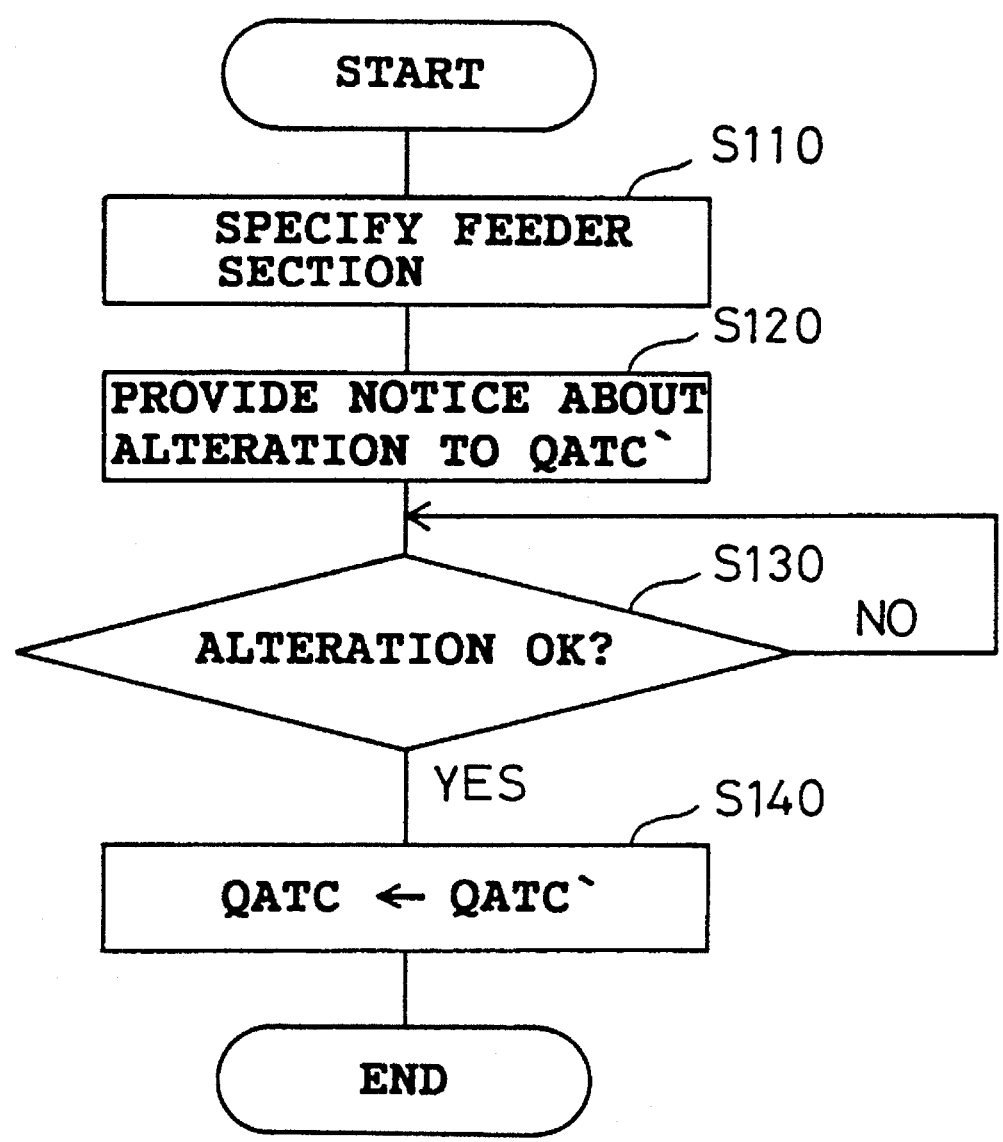
FIG. 6 is a flowchart of the condition alteration process performed by the control center in the first embodiment.

The control center CTLRM first determines, as shown in FIG. 6, which feeder section must have its condition altered, in step S110. The control center CTLRM then provides notice to the substation corresponding to the determined section the that the ATC condition QATC will be altered, in step S120. The notice to the substation SS also includes the indication of the altered ATC condition QATC`.

Upon receiving from the substation SS the signal indicating that the condition alteration is permitted, in step S130, the control center CTLRM executes the alteration of the ATC condition QATC, in step S140 and the maximum velocity is varied.

Figure 7:
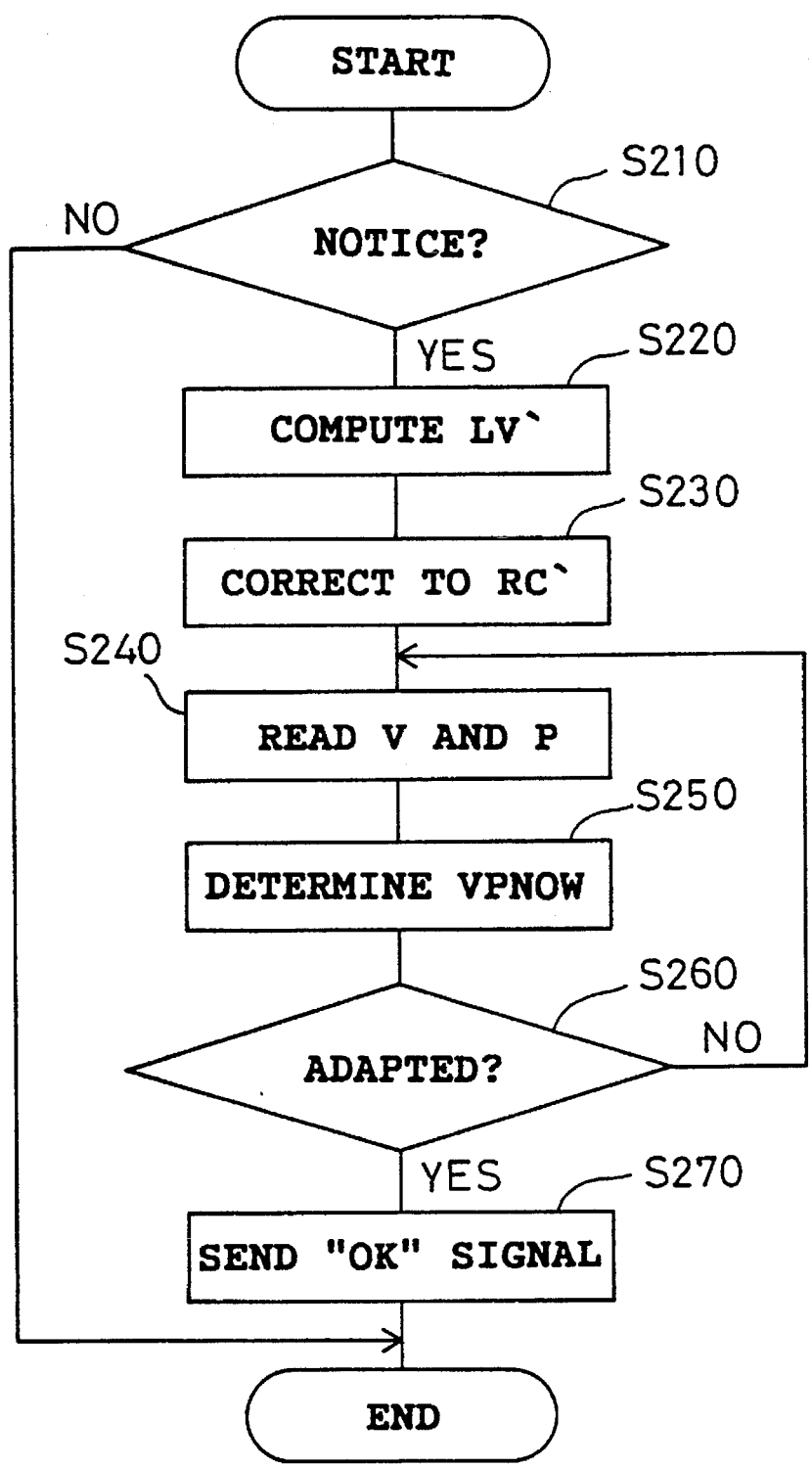
FIG. 7 is a flowchart of the condition alteration process performed by the substation in the first embodiment.

Meanwhile, the control process shown in FIG. 7 is performed at the substation SS in preparation for the alteration of the ATC condition QATC.

The control process starts, step S210, when the substation SS receives the notice that the ATC condition QATC will be altered. At the next step S220, a provisional ATC curve LV` is obtained according to the altered ATC condition QATC`, step S220. According to the obtained provisional ATC curve LV`, the run curve RC is corrected, step S230. Thus, the correction of the run curve RC is effected without changing the ATC curve LV. Therefore, once a provision of notice about the condition alteration is given, the determination at step S50 is made according to the ATC curve LV based on the original ATC condition QATC, while the determination at step S60 is made according to the run curve RC` derived by correcting the original run curve RC according to the altered ATC condition QATC`. Consequently, the velocity of the linear motor car LMC can be corrected to a great extent, without activating the emergency brake system 20.

Following the correction of the run curve RC, the velocity V and the position P of the linear motor car LMC that are received via the repeater station 11 are read, in step S240. Then, the current velocity versus position relation VPNOW of the linear motor car LMC is determined, in step S250. According to the determined current velocity versus position relation VPNOW, it is next determined whether the linear motor car LMC is currently operating under the corrected run curve RC`, in step S260. If "YES" is determined at step S260, a signal indicating that "the alteration of the ATC condition QATC is allowed" is sent to the control center CTLRM, in step S270.

In response, the control center CTLRM performs the alteration of the ATC condition QATC. In addition, the ATC curve generating apparatus 1 and the run curve generation apparatus 3 generate a new ATC curve LV and a new run curve RC, respectively, according to the altered ATC condition QATC`. The control over the velocity of the linear motor car LMC is thus prepared according to the altered ATC condition QATC`.

According to the present invention, an emergency stop may be effected in the following manner without activating the emergency brake system 20.

Figure 8A:
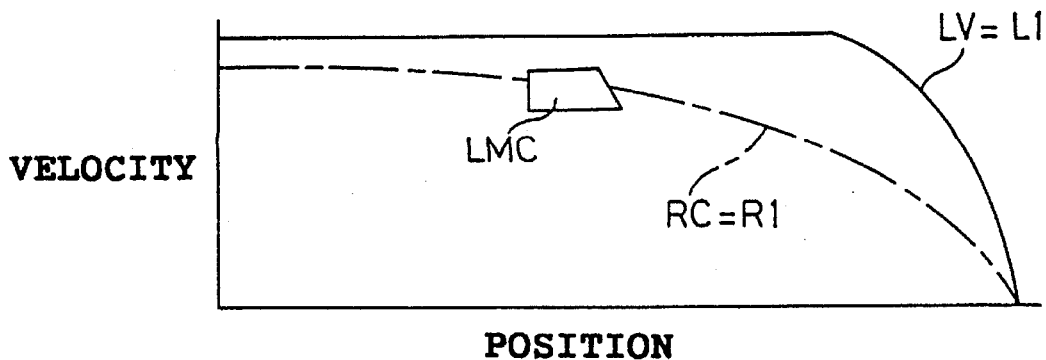
FIGS. 8A through 8D are graphs showing the shift of the train's velocity when an emergency stop is effected in the first embodiment.

FIG. 8A shows the control process of the linear motor car LMC regularly performed. As shown in the figure, according to a specified ATC condition QATC, the ATC curve LV=L1 and a corresponding run curve RC=R1 are generated. The linear motor car LMC is operated according to the run curve RC=R1, as shown in steps S10 through S80.

Figure 8B:
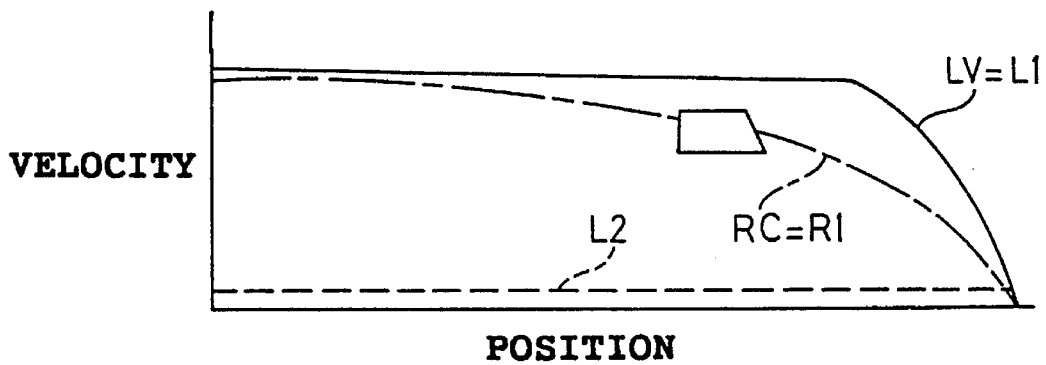

When an emergency stop is required, the control center CTLRM provides notice about the change of the ATC condition QATC to the altered ATC condition QATC`, in step S120. Then, a provisional ATC curve L2, shown in FIG. 8B, is computed according to the altered ATC condition QATC`, in step S220.

Figure 8C:
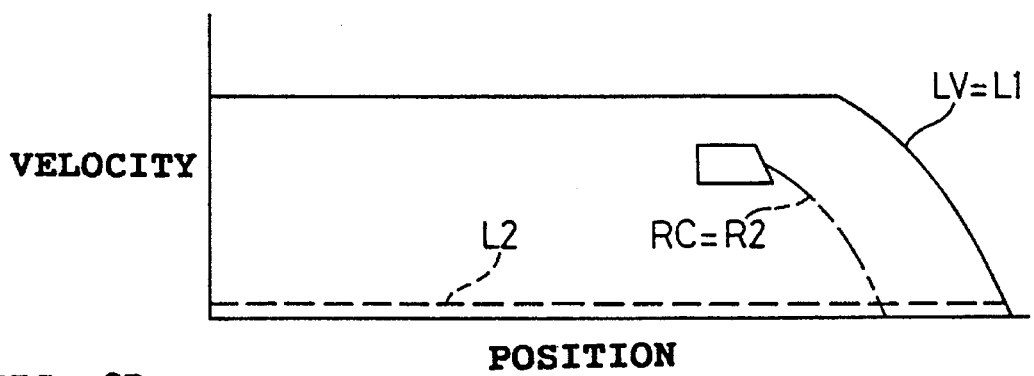

Subsequently, according to the provisional ATC curve L2, a run curve RC is corrected, in step S230, to a run curve R2, as shown in FIG. 8C. Further velocity control of the linear motor car LMC is performed according to the run curve R2. In this case, the determination at step S50 is made according to the ATC curve L1 that was derived based on the original ATC condition QATC before alteration. Therefore, even if the current state of the linear motor car LMC goes above the provisional ATC curve L2, the emergency brake system 20 is not activated.

Figure 8D:
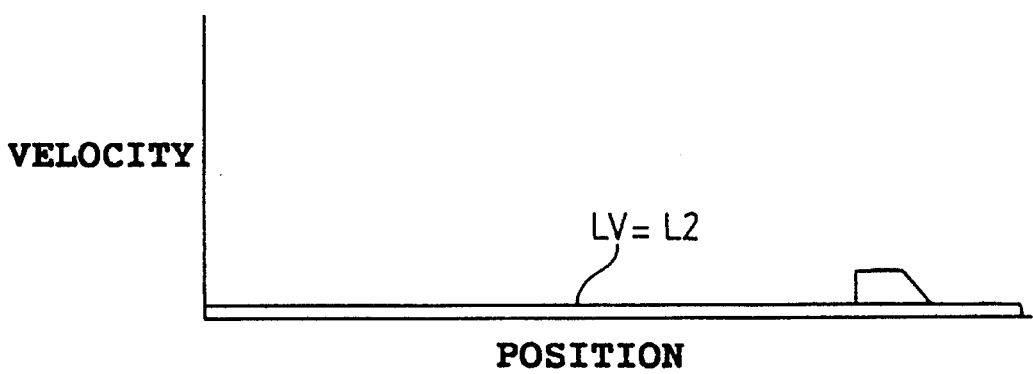

Consequently, only when the linear motor car LMC is sufficiently slowed or stopped as a result of the control based on the corrected run curve RC=R2, the ATC curve LV is changed to the ATC curve L2, as shown in FIG. 8D, step S140.

According to the present invention, a severe deceleration along a limited section of the railway line is accomplished in the following manner.

Figure 9A:
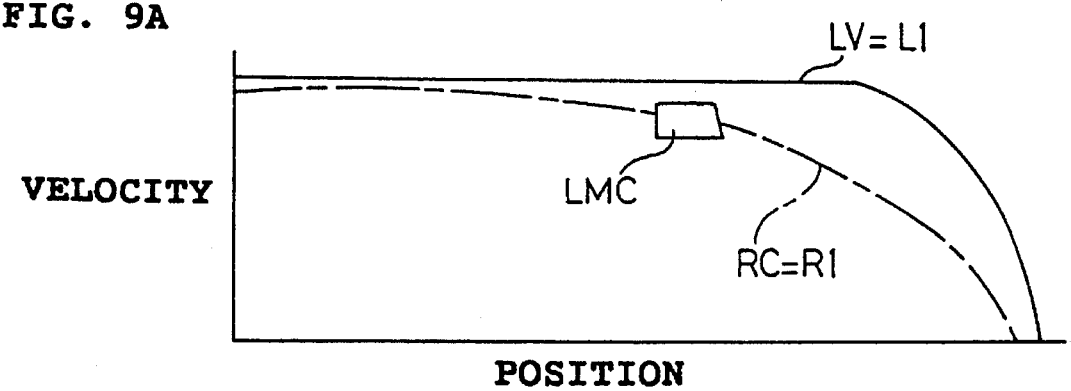
FIGS. 9A through 9D are graphs showing the shift of the train's velocity when an emergency deceleration is effected in the first embodiment.

FIG. 9A shows the regular velocity control of the linear motor car LMC. As shown in that figure, according to an automatic train condition QATC, the ATC curve LV=L1 and a corresponding run curve RC=R1 are generated. The linear motor car LMC is operated according to the run curve RC=R1, in steps S10 through S80.

Figure 9B:
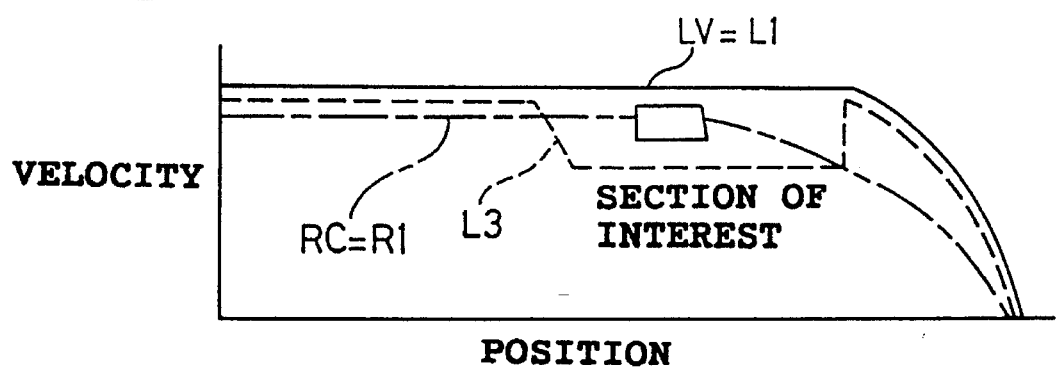

When a severe deceleration is required, the control center CTLRM makes an advance indication of the altered ATC condition QATC`, step S120. Then, a provisional ATC curve L3, shown in FIG. 9B, is computed according to the altered ATC condition QATC`, in step S220.

Figure 9C:
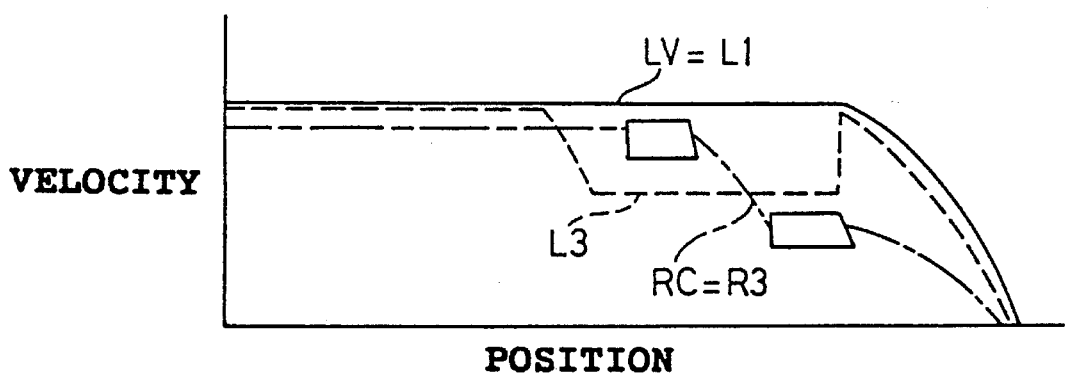

Subsequently, according to the provisional ATC curve L3, a run curve RC is corrected, in step S230, to a run curve R3, as shown in FIG. 9C. Further velocity control of the linear motor car LMC is performed according to the run curve R3. In this case, the determination at step S50 is made according to the ATC curve L1 that was derived based on the original ATC condition QATC before alteration. Therefore, even if the linear motor car LMC is running at the velocity above the provisional ATC curve L3, the emergency brake system 20 is not activated.

Figure 9D:
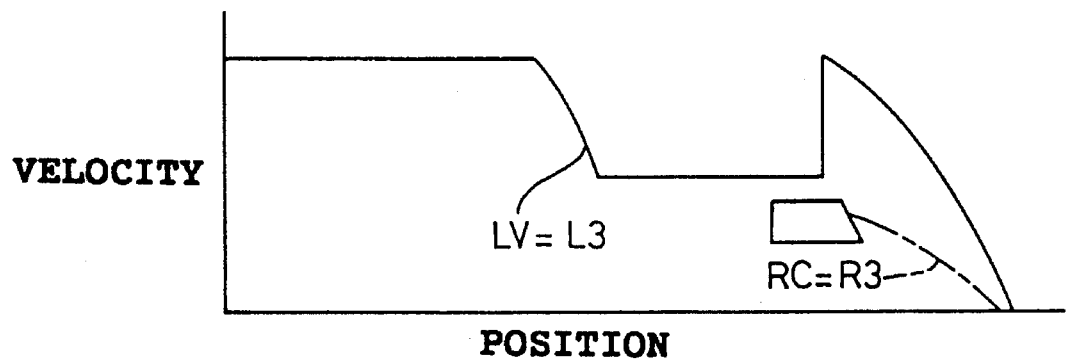

Consequently, only when the linear motor car LMC is decelerated and adapted to the corrected run curve RC=R3, is the ATC curve LV changed to the ATC curve L3, as shown in FIG. 9D, step S140.

As explained above, when an emergency stop or a severe deceleration is required, the control center CTLRM does not abruptly execute the alteration of the ATC condition QATC. Instead, the fact that the ATC condition QATC will be altered and the altered ATC condition QATC` are communicated in advance to the corresponding substation SS. In response to this communication, the substation SS controls and adapts the velocity of the linear motor car LMC such that the alteration of the ATC condition QATC will not bring about sudden braking.

When actually executing the emergency stop or deceleration, it is not required for the control center CTLRM to check the position of the train and seek for an appropriate timing to instruct the stop or deceleration. Therefore, even on congested lines, the difficulty in performing a stop or deceleration is alleviated. Further, a sudden braking is not required for the train, and the emergency brake system 20 and the body of the train are not damaged.

In a second embodiment, the present invention is applied to a conventional railway train, with a station and a motorman corresponding to the control center CTLRM and the run curve generation apparatus 3, respectively, of the first embodiment.

Figure 10:
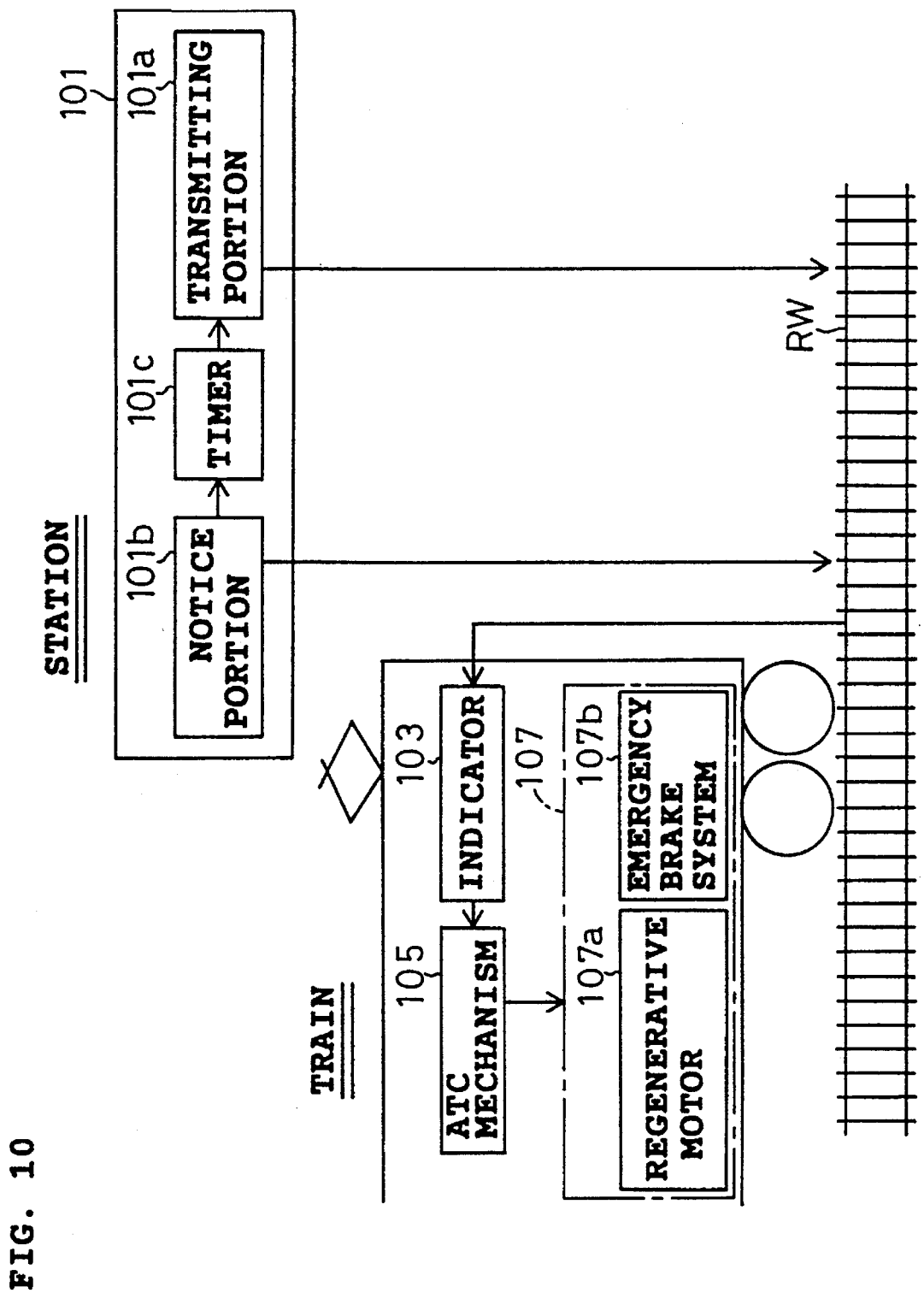
FIG. 10 is a block diagram illustrating the structure of the system of the second embodiment according to the present invention.

The system of this embodiment, as shown in FIG. 10, includes a transmitting apparatus 101 that is provided at a station and sends out an ATC condition QATC, a railway RW serving as communication line to communicate the ATC condition QATC from the station to a train on the railway, the train moving on the railway, an indicator 103 provided on the train to indicate the ATC condition QATC, and an ATC mechanism 105 provided on the train.

The transmitting apparatus 101 includes a transmitting portion 101a which sends out the ATC condition QATC, and a notice portion 101b to give notice about the alteration of the ATC condition QATC. The information sent out from the transmitting portion 101a is supplied to the ATC mechanism 105 via the indicator 103 on the train. The information from the notice portion 101b is shown on the indicator 103.

In response to the alteration of the ATC condition QATC, an operation lever of the notice portion 101b is first switched to be adapted to the altered ATC condition QATC`, and a predetermined time period is set at a timer 101c included in the transmitting apparatus 101. When the predetermined time period has elapsed, the operation lever of the transmitting portion 101a is switched.

The ATC mechanism 105 activates an ATC brake system 107 when the current velocity of the train is over the automatic train control condition supplied via the indicator 103. In response, the ATC brake system 107 performs various actions depending on the degree by which the current velocity of the train exceeds the specified ATC condition QATC. For instance, when the velocity of the train is slightly higher (e.g. one step when the ATC condition QATC is determined stepwise as in the Tokaido Shinkansen) than the specified ATC condition QATC, deceleration is performed by utilizing the function of a regenerative motor 107a as in ordinary deceleration. On the other hand, when the velocity of the train greatly execeeds the specified ATC condition QATC, the deceleration attained by the regenerative motor 107a is not sufficient. In this case, in addition to the regenerative motor 107a, the emergency brake system 107b is activated, thereby locking the wheels of the train. However, damages to the wheels and the brake system or the injuries to the passengers are inevitable when the emergency brake system 107b is activated.

Figure 11:
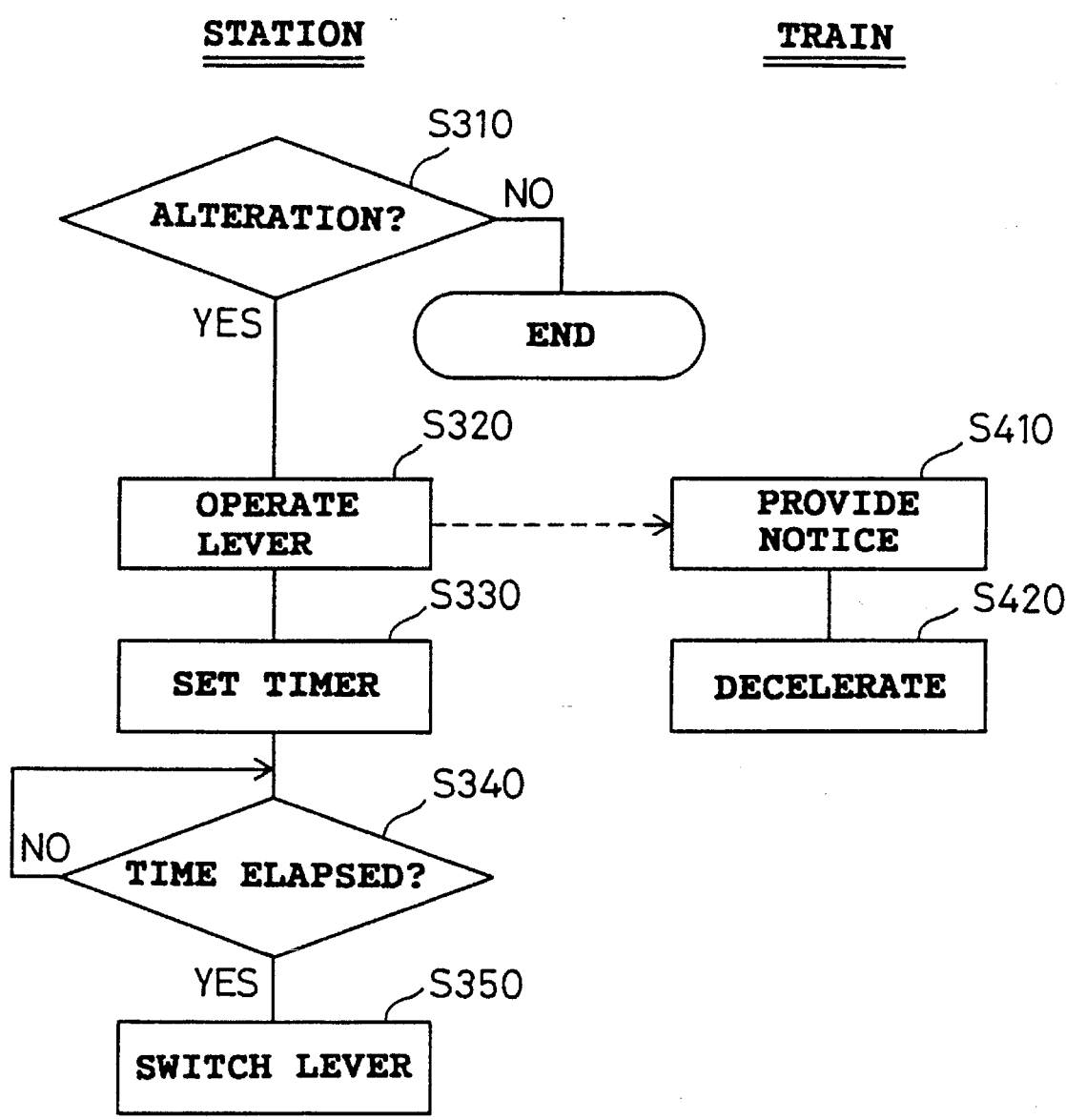
FIG. 11 is a flowchart of the velocity control performed by the station and of the train in the second embodiment.

In this embodiment, the following process, as shown in FIG. 11, is taken in order to effect alteration of the ATC condition QATC.

When the need to immediately stop or severely decelerate the train arises, the position of the operation lever of the notice portion 101b of the transmitting apparatus 101 is changed at the station, in steps S310 and S320. As a result, notice about the impending alteration in maximum velocity and the altered ATC condition QATC are sent to the train and shown on the indicator 103, in step S410. At the station, along with the communication to the train, a predetermined time period is set at the timer 101c. The predetermined time period varies with respect to the degree by which the ATC condition QATC is to be altered, such that the predetermined time period gets relatively longer as the ATC condition QATC is altered by a greater degree. When the predetermined time period set at the timer 101c has elapsed, the operation lever of the transmitting apparatus 101a is switched, as in steps S340 and S350. Thus, the switching of the operation lever of the transmitting apparatus 101 is delayed until the predetermined time period has elapsed.

Meanwhile, the motorman on the train, informed of the altered ATC condition QATC` from the indicator 103, decelerates the train through operation of the notch and occasionally through regenerative braking such that the current train's velocity adapts to the altered condition, step S420. Therefore, when the predetermined time period has elapsed and the ATC condition QATC is altered, the train has been sufficiently slowed down and a sudden braking does not result.

Consequently, on the ordinary railway lines, an urgent stop or deceleration can also be performed, immediately if necessary, without causing a sudden braking and without requiring a special attention to the timing, even on congested lines, to accomplish the stop or deceleration.

Figure 12:
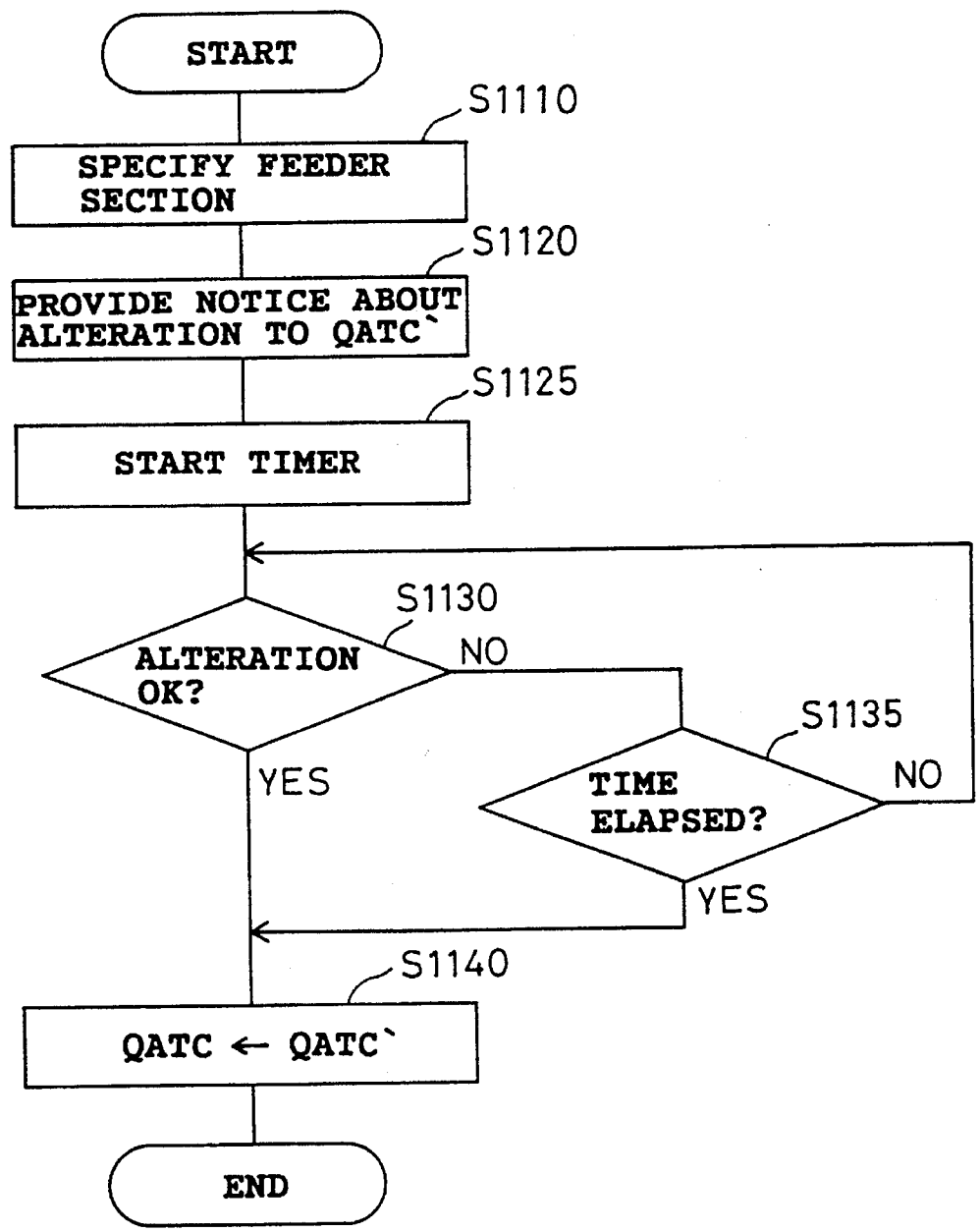
FIG. 12 is a flowchart of the condition alteration process performed by the control center in the third embodiment according to the present invention.

A third embodiment explained hereinafter is an example of the modification of the first embodiment. The hardware structure of this embodiment is similar to that of the first embodiment, with the exception being the process of FIG. 12 instead of the process of the first embodiment shown in FIG. 6.

In this embodiment, in order to effect the alteration of the ATC condition QATC, the control center CTLRM first determines which feeder sections must have their automatic train control condition altered, in step S1110. The control center CTLRM then provides notice about the alteration of the ATC condition QATC to the substation corresponding to the specified feeder section, as in step S1120, and starts the timer, in step S1125. When a signal is received from the substation SS indicating that the alteration of the ATC condition QATC is allowed, as in step S1130, the control center CTLRM executes alteration of the ATC condition QATC, in step S1140. On the other hand, if it is determined at step S1130 that the train is not yet at a desired velocity, the elapse of the predetermined time period is checked by the timer, in step S1135. In the case where the predetermined time period has elapsed but the substation has not provided a signal indicating that the alteration is acceptable, the control center CTLRM performs a mandatory alteration of the ATC condition QATC, as shown in steps S1135 through S1140.

In spite of the communication to the train about the alteration of the ATC condition QATC, a case can arise when the train is not slowed down due to control errors at the train or at the substation. By virtue of the structure explained above, the system of the present embodiment can perform, at the expense of the deterioration of the brake system, mandatory alteration of the ATC condition QATC. Therefore, when an emergency stop of the train takes priority over the deterioration of the brakes, the system of this embodiment is preferred to the system of the first embodiment.

Thus, according to the system of this embodiment, the ATC condition QATC is not abruptly altered by the control center CTLRM. Instead, the control center CTLRM communicates notice beforehand about an impending alteration of velocity and the altered ATC condition QATC` to the substation. Responsively, the substation SS controls the velocity of the linear motor car LMC, thereby attaining the position versus velocity relation based on the altered ATC condition QATC`. Only when it is determined that the train is no longer in the state where the alteration triggers the activation of the emergency brake system 20, the control center CTLRM performs the control process necessary to effect the alteration of the ATC condition QATC.

This invention has been described above with reference to preferred embodiments as shown in the drawings. Modifications and alterations may become apparent to one skilled in the art upon reading and understanding the specification. Despite the use of the embodiments for illustration purposes, it is intended to include all such modifications and alterations within the scope and spirit of the appended claims.

For instance, while the present invention is applicable to systems in which the velocity is controlled on the ground, the present invention may be applied to a system in which the velocity is controlled by units equipped on the train. In this case, receiving the altered ATC condition QATC`, the train ignores it and maintains the former ATC condition QATC until a predetermined time period has elapsed or the train has been sufficiently slowed down. Once the time or the velocity condition is attained, the train adopts the altered ATC condition QATC`.

Thus, the present invention achieves a timely and smooth stop or deceleration of a train without causing a sudden braking even on a congested line.

Wherefore, having described the present invention, what is claimed is:

1. A method for controlling velocity of a train having an emergency braking system that is automatically activated only when the velocity of the train exceeds a maximum permissible velocity predetermined over a section of track, said method comprising the steps of:

providing the train with both a conventional braking system and a separate emergency braking system;

providing notice about an impending alteration of the maximum permissible velocity over the section prior to the maximum permissible velocity over the section being altered to a new maximum permissible velocity; and thereafter altering the maximum permissible velocity from the previous maximum permissible velocity to said new maximum permissible velocity; and only activating said emergency braking system when a velocity of the train exceeds the maximum permissible velocity over a predetermined section of track.

2. The method according to claim 1, further comprising the step of providing the notice to one of the train and a facility controlling the velocity of the train about any change in the maximum permissible velocity.

3. The method according to claim 2, further comprising the step of delaying alteration of the maximum permissible velocity to said new maximum permissible velocity for a sufficient time period to allow the train to reduce its velocity to a velocity less than or equal to said new maximum permissible velocity, and said reduction in velocity is realized by the use of at least one of said conventional braking system and friction.

4. The method according to claim 3, further comprising the step of using a regenerative motor to alter the velocity of the train to a velocity less than or equal to said new maximum permissible velocity.

5. The method according to claim 3, further comprising the step of altering the maximum permissible velocity to said new permissible maximum velocity only once it is confirmed that the train is currently traveling at a velocity less than or equal to said new maximum permissible velocity.

6. The method according to claim 3, further comprising the step of, after said time period has elapsed, mandatorily altering said permissible maximum velocity to said new maximum permissible velocity even if the current velocity of the train is still greater than said new maximum permissible velocity and will trigger activation of an emergency brake system.

7. A device for controlling the velocity of a train having an emergency braking system that is only automatically activated when the velocity of the train exceeds a maximum permissible velocity predetermined over a section of track, said device comprising:

the train having both a conventional braking system and a separate emergency braking system;

means for communicating said maximum permissible velocity for triggering activation of brake system;

means for providing notice about an impending alteration of said maximum permissible velocity prior to said maximum permissible velocity being altered to a new maximum permissible velocity; and means for altering the maximum permissible velocity from the previous maximum permissible velocity to said new maximum permissible velocity wherein said emergency braking system is only activated when an actual velocity of the train exceeds the maximum permissible velocity over a predetermined section of track.

8. The device according to claim 7, wherein said device further comprises means for delaying alteration of the maximum permissible velocity to said new maximum permissible velocity for a sufficient time period to allow the train to reduce its velocity to a velocity less than or equal to said new maximum permissible velocity, and said reduction in velocity is realized by the use of at least one of said conventional braking system and friction.

9. The device according to claim 8, wherein said device further comprises:

means for receiving information concerning at least the current velocity of the train; and confirmation means, incorporated in said means for altering the maximum permissible velocity, for performing alteration of said permissible maximum velocity to said new permissible maximum velocity only once it is confirmed that the train is currently traveling at a velocity less than or equal to said new maximum permissible velocity.

10. The device according to claim 9, wherein said device further comprises means for mandatorily altering said permissible maximum velocity to said new permissible maximum velocity, after said time period has elapsed, even if the current velocity of the train is greater than said new maximum permissible velocity and will trigger activation of an emergency brake system.

11. The device according to claim 9, wherein said device further comprises a regenerative motor for altering the velocity of the train to a velocity less than or equal to said new maximum permissible velocity.

12. The method according to claim 1, further comprising the steps of carrying said emergency braking system on the train and forming said conventional braking system as part of the track upon which the train travels.

13. The method according to claim 1, further comprising the steps of providing a control unit for actuating said emergency braking system;

supporting a plurality of wheels the train;

coupling a wheel elevator to said control unit, supporting said wheel elevator by the train for lowering said plurality of wheels during emergency braking so that the train is supported on the track upon which the train is traveling by said plurality of wheels;

associating brakes with said plurality of wheels for preventing rotation of said plurality of wheels during emergency braking; and coupling a brake actuator to said control unit for actuating said brakes during emergency braking.

14. The device according to claim 9, wherein said emergency braking system is carried by the train and said conventional braking system is formed as part of the track upon which the train travels.

15. The device according to claim 7, wherein said emergency braking system comprises a control unit for actuating said emergency braking system;

a plurality of wheels supported by the train;

a wheel elevator coupled to said control unit, said wheel elevator is supported by the train for lowering said plurality of wheels during emergency braking so that the train is supported on the track upon which the train is traveling by said plurality of wheels;

brakes associated with said plurality of wheels for preventing rotation of said plurality of wheels during emergency braking; and a brake actuator, coupled to said control unit, for actuating said brakes during emergency braking.

16. A method for controlling velocity of a train having an emergency braking system that is automatically activated only when the velocity of the train exceeds a maximum permissible velocity predetermined over a section of track, said method comprising the steps of:

providing the train with both a conventional braking system and a separate emergency braking system;

providing notice about an impending alteration of the maximum permissible velocity over the section prior to the maximum permissible velocity over the section being altered to a new maximum permissible velocity;

allowing the train to change to new velocity below the new maximum permissible velocity by one of friction and use of the conventional braking system; and altering the maximum permissible velocity from the previous maximum permissible velocity to said new maximum permissible velocity; and activating said emergency braking system only when a velocity of the train exceeds the maximum permissible velocity over a predetermined section of track.

* * * * *